No. 724,854. PATENTED APR. 7, 1903.
E. HAAS.
PLOW.
APPLICATION FILED SEPT. 4, 1902.
NO MODEL. 2 SHEETS—SHEET 1.

Witnesses
C. E. Hunt.
George Thom

Inventor
Edward Haas
By H. B. Willson & Co.
Attorneys

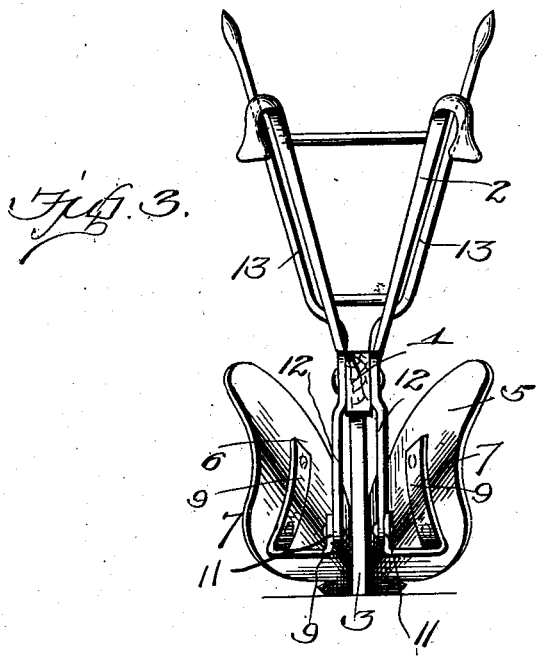
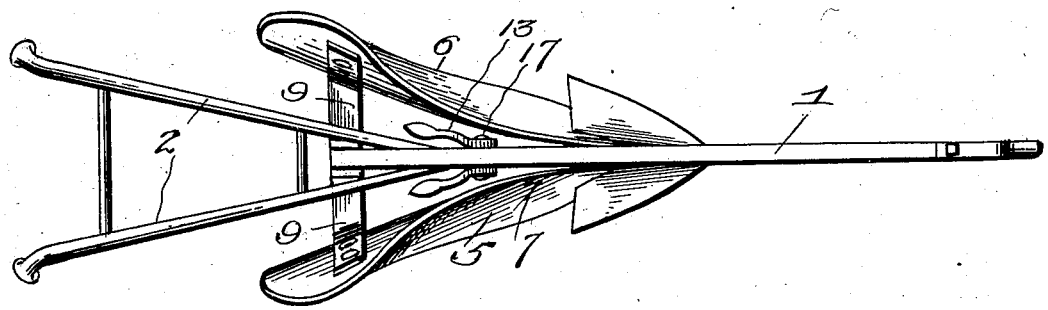

UNITED STATES PATENT OFFICE.

EDWARD HAAS, OF SAN ANTONIO, TEXAS.

PLOW.

SPECIFICATION forming part of Letters Patent No. 724,854, dated April 7, 1903.

Application filed September 4, 1902. Serial No. 122,118. (No model.)

*To all whom it may concern:*

Be it known that I, EDWARD HAAS, a citizen of the United States, residing at San Antonio, in the county of Bexar and State of Texas, have invented certain new and useful Improvements in Plows; and I do declare the following to be a full, clear, and exact description of the invention, such as will enable others skilled in the art to which it appertains to make and use the same.

The invention relates to plows.

The object of the invention is to provide a plow which shall be simple of construction, durable in use, comparatively inexpensive of production, and which may be used as a "sweep-plow" or as a sidehill-plow.

With these objects in view the invention consists in certain features of construction and combination of parts, which will be hereinafter fully set forth.

Figure 1:
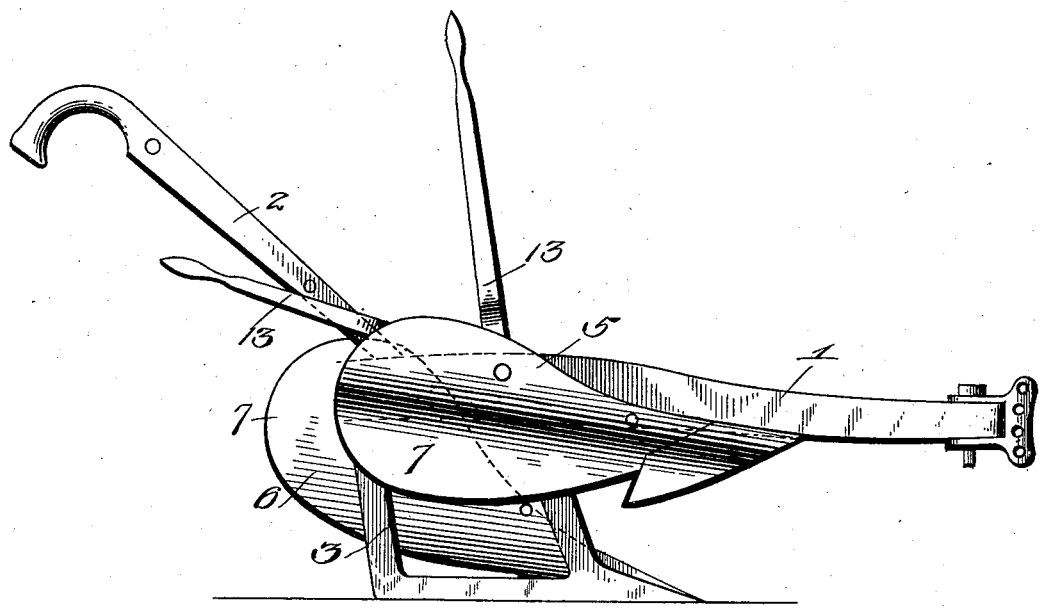
Figure 4:
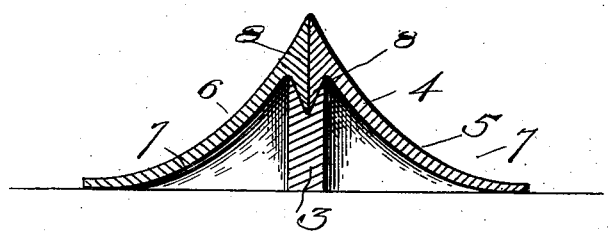

In the accompanying drawings, Figure 1 is a side elevation of my improved plow, showing the share on the right-hand side of the plow elevated and the one on the left-hand side of the plow depressed or in an operative position as a sidehill-plow. Fig. 2 is a top plan view showing the parts in the position they assume when the plow is used as a sweep-plow. Fig. 3 is a rear view of the plow. Fig. 4 is a transverse sectional view through the landside-point and the share-points.

In the drawings, 1 denotes a plow-beam, 2 the handles, and 3 the landside, the standards of which are connected to the plow-beam in any desired manner and the point of which is provided on its upper surface with a longitudinal groove 4.

5 denotes the right-hand plowshare, and 6 the left-hand plowshare, each of which is preferably provided with a moldboard 7. The point of each share overlaps the point of the landside and is provided with a downwardly-extending rib or feather 8, which fits into the longitudinal groove and steadies the moldboard of the shaft when in working position.

9 denotes a bracket secured to the inner side of each moldboard and provided with an upturned end 11, to which is pivoted the lower end of a link 12, which has its upper end pivoted to the rear end of the plow-beam.

13 denotes a lever, one pivoted on each side of the plow-beam and each having its lower end pivoted to the moldboard at a point intermediate its ends. When used as a sweep-plow, both moldboards are lowered and have their ribs in engagement with the longitudinal grooves of the landside, in which position side thrust is entirely resisted. When used as a sidehill-plow, one of the shares is elevated, while the other share is allowed to work while the plow is moving in one direction. When the plow is turned around to move back to the point from which it started, the lowered or working share is now raised and the idle or elevated share is now lowered. This operation takes place at each end of the furrow until the side hill has been plowed to the desired amount.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

In a plow, the combination with the landside; of shares arranged on the opposite sides of the landside, the point of the landside being provided with a groove, the points of the shares with ribs to seat in the groove, and means for elevating the shares.

In testimony whereof I have hereunto set my hand in presence of two subscribing witnesses.

EDWARD HAAS.

Witnesses:
B. MENGER,
L. WM. MENGER.